3,830,851
PROCESS FOR PREPARING 1-ARYLOXY-2-PROPANOLS
Joseph David, Keith Thomas, and Nand Kishore, Welwyn Garden City, England, assignors to Catomance Limited, Welwyn Garden City, England
No Drawing. Filed Jan. 12, 1971, Ser. No. 105,973
Claims priority, application Great Britain, Jan. 16, 1970, 2,275/70
Int. Cl. C07c 43/20
U.S. Cl. 260—613 D                                1 Claim

ABSTRACT OF THE DISCLOSURE

1-Aryloxy-2-propanols are made by heating a phenol, propylene oxide and a tertiary amine catalyst in an anhydrous medium below 110° C., the phenol and the propylene oxide only being mixed in the presence of the amine.

---

The invention relates to the production of 1-aryloxy-2-propanols, where the aryl group is generally phenyl or naphthyl and may be unsubstituted or substituted.

Various ways of making aryloxy alkanols are known. Thus in U.S. Specification No. 2,416,263 sodium pentachlorophenate is heated with ethyl alcohol, sodium hydroxide and 1 - chloropropanol - 2. This produces 1-pentachlorophenoxy - 2 - hydroxypropane but in a low yield. It is also shown in that specification how pentachlorophenol can be reacted with ethylene oxide to produce pentachlorophenoxy ethoxy ethanol.

In British Specification No. 628,497 a mixture of a phenol and glycidol is formed and a salt forming tertiary amine is added. If an attempt is made to operate this process using propylene oxide instead of glycidol highly unsatisfactory results are obtained. Thus, generally, the reaction medium explodes and, at the most, very low yields of the desired 1-aryloxy-2-propanol are obtained and the reaction product may contain a considerable proportion of aryloxy-polypropoxy-propanol.

The particular problems that arise in the reaction of a phenol with ethylene oxide or propylene oxide are discussed in French Specification No. 1,386,347. It is described there that if an alkaline catalyst is used in an anhydrous medium aryloxy polyalkoxy alkanols are obtained and it is proposed to use, instead, a catalyst such as potassium chloride. Again, however, the process is rather unsatisfactory in that low yields tend to be obtained.

According to the invention we prepare a 1-aryloxy-2-propanol by heating a substantially anhydrous reaction mixture which comprises a phenol, 1:2-propylene oxide and a tertiary amine catalyst at a temperature below 110° C., the phenol and the propylene oxide only being mixed in the presence of the amine. The tertiary amine is introduced into the reaction mixture as a solution either in the phenol or as a solution in the propylene oxide. Thus at no time is the phenol mixed with the propylene oxide in the absence of the tertiary amine. Instead the catalyst is dissolved in one of the reactants and the other reactant then mixed into the solution.

The reaction mixture is heated to promote the reaction. However the temperature must be kept below about 110° C. or else the risk of side reactions increases undesirably. Thus the preferred temperature range is from 40 to 110° C. and most preferably from 60 to 110° C. The reaction is generally conducted under atmospheric pressure and it is convenient to conduct it under reflux. It will be found that the reflux temperature will, at the start of the reaction, be around 65 to 70° C. and that it will increase as the reaction proceeds. Preferably therefore the temperature is gradually increased so that the mixture is always under reflux, up to a maximum of about 110° C. In addition to side reactions, higher temperatures result in loss of propylene oxide.

Only a catalytic amount of the amine is required, for example less than 5% by weight and usually about 1%.

The amine is preferably one that is liquid at room temperature and is preferably a tertiary amine. Suitable amines include pyridine, trimethylamine, triethylamine and dimethylaniline. Triethylamine is the preferred catalyst and generally gives the highest yields.

The amount of propylene oxide per mole of phenol is usually 1–1.5 moles, preferably 1 to 1.3 moles.

The reaction medium is substantially anhydrous and is preferably free of all solvent and thus generally consists solely of propylene oxide, tertiary amine and the phenol.

The reaction is usually conducted for from ½ to 20 hours, usually 1 to 10 hours.

By the method of the invention a reaction product substantially free of aryloxy propoxy propanols and other undesirable by-products is obtained. For example at least 90% of the reaction product is usually the desired aryloxy propanol. The degree of conversion is highly satisfactory. Thus it is nearly always above 50% and is often above 75%. Under the most satisfactory conditions, for example when triethylamine is used as the catalyst, conversions of at least 95%, based on the weight of phenol, can easily be obtained.

These values should be compared with the values obtained when caustic soda is used as the catalyst. For example at atmospheric pressure the optimum conversion that can be obtained using caustic soda is usually about 40%. A higher conversion can be obtained if caustic soda is used under pressure but a large proportion of the product is aryloxy polypropoxy propanols.

The method of the invention is so efficient that the reaction product can be used for many industrial purposes without any major purification step. For example at the most it is usually sufficient simply to wash the mixture with acid to remove amine and with alkali to remove unreacted phenol, and even these washing steps may be unnecessary.

An important use of 1-aryloxy-2-propanol is described in our Patent Application No. 105,972 filed even date herewith. It is described in that specification how the compounds may be esterified with sulphuric, ortho phosphoric, pyro phosphoric or phosphorous acid to form water soluble compounds having valuable properties for preserving articles against biodegradation. For the production of such biocides it is not necessary to purify the reaction products obtained in the invention, except that it may be desirable to wash with acid and alkali, as described.

The aryl group of the phenyl can be substituted or unsubstituted and thus it may be, for example, an unsubstituted phenyl group or an unsubstituted naphthyl group. We are primarily concerned with phenyl groups having particularly useful biocidal activity for which purpose the aryl group is usually either a substituted or unsubstituted naphthyl group or a substituted phenyl group. Preferred substituents are halogen, usually chlorine or bromine, nitro, hydroxy, aryl, alkyl, cycloalkyl, alkaryl, alkoxy, aryloxy and acyl. When the substituent is aryl then the aryl substituent may itself be, for example, a phenyl group which may be substituted with any of the substituents listed above for the substituents on the aryl. Any alkyl or alkoxy substituents preferably each contain less than 8 carbon atoms, and preferably less than 4. Cycloalkyl groups may contain 5 to 8 carbon atoms. The preferred alkaryl group is methyl. The preferred alkaryl group is benzyl although it can be an alkaryl group that is itself part of an aryloxypropanol. For example the aryl group may be a bis-propanoloxy diphenyl alkane. It is often preferred that there should be more than one substituent in which case the substituents may be the same or different.

When the aryloxy alkanols are to be used as biocides, either as such or after esterification with sulphuric, phosphoric or phosphorous acid, the aryl radical is preferably a phenyl substituted by from 1 to 5, preferably 2 to 5, bromine atoms, 4 or 5 chlorine atoms, 3 chlorine atoms provided they are in the 2, 4 and 6-positions (the 2, 4, 5-positions are not so satisfactory), a phenyl radical, a benzyl radical, a hydroxyl radical, or substituted by a combination of halogen atoms, generally chlorine, with alkyl, generally methyl, cycloalkyl or hydroxyl.

Particularly preferred biocides are those in which the aryl group is a phenyl group which is substituted by 2,6-dibromo, 2,4,5-tribromo, 2,4,6-tribromo or trichloro, 2,4,5,6-tetrabromo, pentabromo, pentachloro, 2-phenyl, 2-phenyl-4-chloro, 2-benzyl-4-chloro, 3,5-dimethyl-2,6-dichloro, 3,5-dimethyl-4-chloro, 3-methyl-4-chloro, 2-hydroxy, 3-hydroxy, 2-hydroxy methyl, or 2-cyclopentyl-4-chloro. A preferred bis-propanoloxy diphenyl alkane is 2,2-dipropanoloxy-5,5'-dichloro diphenyl methane.

The optimum way of carrying out the process of the invention with any particular phenol will depend upon the physical characteristics of the phenol. Many phenols are low melting solids and it is inconvenient to form a solution of the tertiary amine in a melt of the phenol, and so it is generally preferred to dissolve the tertiary amine in the propylene oxide and then to mix the phenol into this solution.

In addition to being useful intermediates the compounds have valuable biocidal activity, for example as fungicides and bactericides, for example in the rot proofing of textiles, and they also have insecticidal activity. In particular they have insecticidal activity against the moths that attack textiles. Thus they kill *Tineola bisselliella H, Attagenus piceus, Anthrenus Verbasei*. Some of the compounds, for example 1-pentachloro phenoxy-2-hydroxypropane have very desirable biocidal and/or insecticidal activity but have rather high melting points and it is rather difficult to formulate them into compositions that can be easily handled and applied, such as solutions and dispersions. This problem can be avoided or minimised by mixing such a compound with another aryloxy hydroxypropane having biocidal and/or insecticidal activity but which is a liquid at room temperature. The resultant mixture may then be a liquid, which can easily be dissolved or dispersed in a liquid carrier.

The following are some examples.

EXAMPLE 1

1-Phenoxy-2-propanol 1.3 moles (75.5 g.) of propylene oxide were mixed with 1.74 g. of triethylamine and the mixture was stirred into 1 mole (94 g.) of phenol in a three neck flask fitted with double condenser and a thermometer. The mixture was heated slowly while stirring, to maintain it under reflux. Thus the mixture was initially heated to 65–70° C. and the temperature was gradually increased up to 110° C. Care was taken not to raise the temperature above 110° C. The reaction was complete after about 6 hours. The mixture was cooled, washed with dilute hydrochloric acid to remove the amine, and then with 10% NaOH solution, to remove free phenol. The product was distilled under reduced pressure.

B.P.=83°–84° C. at 1.3 mm.
Specific gravity=1.0621.
*Elemental analysis.*—Calculated: C, 71.0%; H, 7.9%. Found: C, 70.8%; H, 7.76%.

EXAMPLE 2

1-(*o*-Phenyl-phenoxy)-2-propanol 1.3 moles (75.5 g.) of propylene oxide were mixed with 2.55 g. of triethylamine and the mixture was stirred into 1 mole (170 g.) of *o*-phenyl phenol, in a three neck flask fitted with double condenser and a thermometer. The mixture was heated slowly while stirring to maintain it under reflux. Care was taken not to raise the temperature above 110° C. The reaction was complete after about 6 hours. The mixture was cooled, washed with dilute hydrochloric acid to remove the amine, and then with 10% NaOH solution, to remove free phenol. The product was distilled at 120°–124° C. at 0.075 mm. and 147° C. at 0.7 mm. and solidified on standing. A small amount of it was recrystallised from *n*-hexane.

M.P.=49°–50° C.
*Elemental analysis.*—Calculated: C, 79%; H, 7.0%. Found: C, 78.5%; H, 6.8%.

EXAMPLE 3

1-(2:4:6-trichlorophenoxy)-2-propanol 1.3 moles (75.5 g.) of propylene oxide was mixed with 2.84 g. of triethylamine and the mixture was stirred into 1 mole (197.5 g.) of 2:4:6-trichlorophenol in a three neck flask fitted with double condenser and a thermometer. The mixture was heated slowly while stirring to maintain it under reflux. Care was taken not to raise the temperature above 110° C. The reaction was complete after about 6 hours. The mixture was cooled, washed with dilute hydrochloric acid to remove the amine, and then with 10% NaOH solution to remove free phenol. The product solidified on standing and was recrystallised from *n*-hexane.

M.P.=59.5°–60° C.

EXAMPLE 4

1-(Pentachlorophenoxy)-2-propanol 1.3 moles (75.5 g.) of propylene oxide were mixed with 3.55 g. of triethylamine and the mixture was stirred into 1 mole (266.5 g.) pentachlorophenol, in a three neck flask fitted with double condenser and thermometer. The mixture was heated slowly, while stirring to maintain it under reflux. Care was taken not to raise the temperature above 110° C. The reaction was complete after about 6 hours. The mixture was cooled, washed with dilute hydrochloric acid to remove the amine, and then with 10% NaOH solution, to remove free phenol. It was distilled at 142°–144° C. at 0.05 mm. It was recrystallised from *n*-hexane.

M.P.=82° C.
*Elemental analysis.* — Calculated: C, 33.28%; H, 2.18%; Cl, 54.7%. Found: C, 33.4%; H, 2.31%; Cl, 54.6%.

We claim:

1. A process for the preparation of an 1-aryloxy-2-propanol comprising heating under reflux at atmospheric pressure a substantially anhydrous reaction mixture which comprises a phenol, 1:2-propylene oxide and triethylamine as catalyst at a temperature below 110° C., wherein the mole ratio of propylene oxide to phenol is no greater than about 1.5 to 1 and wherein initially the triethylamine is admixed with the phenol or the propylene oxide to avoid mixing the phenol and the propylene oxide in the absence of the triethylamine.

References Cited

UNITED STATES PATENTS 2,428,235   9/1947   Marple et al. _____ 260—613 D

FOREIGN PATENTS 1,386,347   12/1964   France _____ 260—613 D
470,181   12/1936   Great Britain _____ 260—613 D

OTHER REFERENCES

Patat et al.: Z. Naturforsch, 18a (1963), 169–178.

Wittmann: Ber. Bunsenges Physik Chem. 67 (8) (1963), 817–819.

Patat et al.: Die Makromdekulare Chemie, 91 (1966), 231–242.

BRNARD HELFIN, Primary Examiner

U.S. Cl. X.R.

260—613 R; 424—341